United States Patent
Wineland et al.

(10) Patent No.: US 6,635,109 B1
(45) Date of Patent: Oct. 21, 2003

(54) PROCESS FOR MAKING CEMENTS WITH SILICON CONTAINING GRINDING AIDS

(75) Inventors: Jonathan David Wineland, Bedford, KY (US); Sebastiao Walter Lopes da Cunha, Jr., Campinas (BR)

(73) Assignee: Dow Corning Corporation, Midland, MI (US)

( * ) Notice: Subject to any disclaimer, the term of this patent is extended or adjusted under 35 U.S.C. 154(b) by 8 days.

(21) Appl. No.: 10/223,720

(22) Filed: Aug. 20, 2002

(51) Int. Cl.$^7$ ................................. C04B 7/52
(52) U.S. Cl. ................ 106/724; 106/739; 106/757; 106/823
(58) Field of Search ................ 106/724, 729, 106/823, 757

(56) References Cited

U.S. PATENT DOCUMENTS

| | | | |
|---|---|---|---|
| 4,408,030 A | 10/1983 | Marko | 528/10 |
| 5,374,310 A | 12/1994 | Bunce et al. | 106/739 |
| 6,019,667 A | 2/2000 | Bush et al. | 451/36 |

FOREIGN PATENT DOCUMENTS

| | | |
|---|---|---|
| JP | 187958 | 8/1991 |
| WO | WO 00/39046 | 7/2000 |
| WO | WO 00/39047 | 7/2000 |

*Primary Examiner*—Paul Marcantoni

(57) ABSTRACT

Hydraulic cement is made by a process in which (i) raw materials are crushed and ground, (ii) the crushed and ground raw materials and other components are burned and calcined to prepare a cement clinker, and (iii) the cement clinker is ground to a fine powder. A grinding aid is added to the cement clinker before it is ground in (iii). The grinding aid is an uncalcined direct process residue gel, which is an hydrolysis product of alkylhalodisilanes produced as by-products in the manufacture of alkylhalosilanes.

10 Claims, No Drawings

PROCESS FOR MAKING CEMENTS WITH SILICON CONTAINING GRINDING AIDS

FIELD OF THE INVENTION

This invention relates to grinding aids for cement clinker, and to the use of certain direct process residue gels as grinding aids for pulverizing cement clinker to cement. In particular, the grinding aids are hydrolysis products of alkylhalodisilanes and other chlorosilanes produced in alkylhalosilane manufacturing operations.

The grinding aids are capable of reducing the energy consumption in the cement clinker grinding operation. For example, when the compositions are used in cement clinker grinding, one can reasonably expect about a thirty percent increase in surface area of the cement by the addition of about 1,000 ppm of the grinding aid composition during each batch grinding operation. Also, concrete made from such cements exhibits about a five percent increase in standardized 28-day compressive strength comparisons.

These grinding aid compositions based on hydrolyzed products of methylchlorodisilanes offer significant cost advantages over conventional types of grinding aids, such as triethanolamine and diethylene glycol.

BACKGROUND OF THE INVENTION

The cement produced in the greatest volume and the one most widely used in concrete for construction is Portland cement. Portland cement is a hydraulic cement, i.e., it sets, hardens, and does not disintegrate in water. The term cement, therefore, as used herein is intended to define inorganic hydraulic cements, principally Portland and related cements. The essential feature of such cements is their ability on hydration to form with water relatively insoluble bonded aggregations of considerable strength and dimensional stability.

Hydraulic cements are manufactured by (i) processing and proportioning a number of raw materials, (ii) burning the raw materials, i.e., clinkering them at a suitable temperature, and (iii) grinding the resulting hard nodules called clinker to a fineness required for an adequate rate of hardening by reaction with water.

Most Portland cements consist mainly of tricalcium silicate $Ca_3SiO_5$ and dicalcium silicate $Ca_2SiO_4$. Typically, and in this regard, two types of raw materials are required, (a) one being rich in calcium such as limestone, chalk, marl (cement rock), oyster shells, or clam shells; and (b) the other being rich in silica such as clay or shale. The two other most significant phases in any Portland cement are tricalcium aluminate $Ca_3Al_2O_6$ and a ferrite phase. A small amount of calcium sufate $CaSO_4$ in the form of gypsum or anhydrite is also added during grinding to control the setting time and to enhance the strength development.

Clinker in Portland cements manufactured from raw materials including components such as calcium carbonate, clay, shale, or sand, is formed by passing such raw materials through a kiln at increasing temperatures during their passage through the kiln. In the kiln itself, free water is evaporated, any water combined with clay is released, magnesium carbonate is decomposed, calcium carbonate is decomposed (calcination), and the lime and clay oxides are combined.

Thus, the process of Portland cement manufacturing consists of (i) quarrying and crushing the rock, (ii) grinding carefully proportioned materials to a high fineness, (iii) subjecting a raw mix to pyroprocessing in a rotary kiln, and (iv) grinding the resulting clinker to a fine powder. Typically, the rock or stone is crushed; the various raw materials are then ground to a powder and blended; the raw mix is converted (changed chemically) into cement clinker by burning the raw mix; and the clinker and gypsum are ground into Portland cement and shipped. These hydraulic cements function as intermediate products used for making concrete, mortar, grout, and composite materials such as asbestos-cement products.

It is not unusual for industrial by-products to be used as raw materials for cement, including such by-products as slags containing carbonate-free lime, silica, and alumina; and fly ash from utility boilers containing finely dispersed silica and alumina.

As an example, U.S. Pat. No. 5,374,310 (Dec. 20, 1994) is directed to the addition of certain direct process residue gels to a cement kiln upstream of the grinding operation, to provide part or all of the silica source for the cement by calcining. In contrast, and according to the present invention, however, the direct process residue gels are added directly to the grinding operation in limited amounts, and without calcining, in order to improve the grinding efficiency. Thus, the present invention differs from the '310 patent in the point of addition of the gel, the gel's function, and the purpose of the gel.

SUMMARY OF THE INVENTION

This invention is directed to a process for manufacturing hydraulic cement in which (i) raw materials are crushed and ground, (ii) the crushed and ground raw materials and other components are burned and calcined to prepare a cement clinker, and (iii) the cement clinker is ground to a fine powder. The improvement contributed according to the present invention is that a certain grinding aid is added to the cement clinker before it is ground in (iii). The grinding aid is an uncalcined direct process residue gel, which is an hydrolysis product of alkylhalodisilanes produced as by-products in the manufacture of alkylhalosilanes.

Preferred grinding aids are high boiling residues of the direct process which have been neutralized to form gels. Typically, these gels are aqueous compositions containing from 1 to about 55 percent by weight of solids, and the balance of the composition to 100 percent is water. The solids typically comprise about 1 to about 50 percent by weight of silicon fines, about 1 to about 40 percent by weight of metal salts, and the balance of the solids to 100 percent by weight is the hydrolysis condensation products of mixed alkylhalosilanes and alkylchlorodisilanes.

These and other features of the invention will become apparent from a consideration of the detailed description.

DETAILED DESCRIPTION OF THE INVENTION

Silicon containing compositions useful in this invention, i.e., the direct process residue gels, are described in U.S. Pat. No. 4,408,030 (Oct. 4, 1983), incorporated herein by reference. This invention herein provides a viable avenue for the recovery of value from such chlorosilicon containing by-products as they are generated during commercial production of silicone polymers. These compositions can be obtained from, for example, processes for reacting silicon metalloid with hydrogen chloride to form chlorosilanes. Thus, chlorosilicon by-products can be obtained from what is commonly called the direct process, where an organochloride such as methyl chloride is reacted with silicon metalloid to form organochlorosilanes. These chlorosilicon by-products typically contain distillation residues, off-specification materials, and excess chlorosilanes.

Thus, according to the direct process, silicones are prepared from silica by reducing silica in an electric furnace to elemental silicon:

$$SiO_2 + 2\ C \rightarrow Si + 2\ CO.$$

The elemental silicon is then treated with compounds such as RCl, typically methyl chloride, according to the direct process:

$$Si + 2RCl \rightarrow R_2SiCl_2.$$

While other products are also obtained, the main product is $R_2SiCl_2$.

Hydrolysis of the main product $R_2SiCl_2$ organochlorosilanes, typically $Me_2SiCl_2$, provides siloxane structures which are used in the manufacture of a variety of other silicone products:

$$(n+m)\ Me_2SiCl_2 + 2(n+m)\ H_2O \rightarrow (Me_2SiO)_m + 2(n+m)\ HCl + HO(Me_2SiO)_nH.$$

Chlorosilicon by-products and processes for hydrolyzing the compositions to direct process residue gels which are useful according to this invention can be prepared by preferred processes in which the chlorosilicon by-product has an SiCl functionality of the material to be hydrolyzed greater than or equal to about 2.8. The average SiCl functionality of the material to be hydrolyzed can be maintained within the prescribed limit by determining the average SiCl functionality of the chlorosilicon by-product and blending it with other chlorosilicon by-products to arrive at the desired average SiCl functionality.

As used herein, the term SiCl functionality of a given chlorosilicon by-product is intended to mean the number of Si—Cl bonds in the chlorosilicon compound. Some representative compounds and their SiCl functionality f are $R_3SiCl$ with f=1, $R_2SiCl_2$ with f=2, $RSiCl_3$ with f=3, $SiCl_4$ with f=4, $RCl_2SiSiCl_2R$ with f=4, $RCl_2SiSiCl_3$ with f=5, and $Cl_3SiSiCl_3$ with f=6, where R represents a non-chlorine organic radical. The average SiCl functionality of the chlorosilicon by-product is therefore the weighted average of SiCl functionality of all Si—Cl containing compounds in the by-product.

Chlorosilicon compounds that may be present within the chlorosilicon by-product include organic substituted and non-organic substituted silanes, disilanes, disiloxanes, silane oligomers, siloxane oligomers, silphenylenes, and silalkylenes, in which at least one Si—Cl bond is present. In addition, it may contain silicon metal fines, metallic copper fines, metal salts, and silicon containing compounds without any Si—Cl bonds.

In preparing the composition, the chlorosilicon by-product with the appropriate average SiCl functionality is added to an aqueous medium which is agitated to facilitate hydrolysis. Both the rate of addition of the chlorosilicon by-product(s) to the aqueous medium, and the rate of agitation of the resulting mixture, can be used to control the particle size of the resulting particulate silicon containing product, i.e., the direct process residue gel. The aqueous medium may consist of only water initially, in which case hydrogen chloride formed by the hydrolysis dissolves in the water. The aqueous medium may also initially contain hydrogen chloride. The term aqueous is intended to mean that the medium contains essentially water as the component reacting with the chlorosilicon by-product, and excludes such organic components as alcohols which are reactive with the chlorosilicon by-product. Thus, the aqueous medium may be in the form of a slurry containing greater than zero to about 20 percent CaO. The amount of the aqueous medium being used can be varied provided sufficient water is employed to completely hydrolyze the chlorosilicon by-product.

Typically, hydrolysis is conducted at temperatures between 20° C. and the boiling point of the aqueous medium. It is preferred that the hydrolysis be carried out at temperatures in the range of about 60 to 105° C. As hydrolysis progresses, a particulate silicon containing product separates from the aqueous medium, i.e., the direct process residue gel. The silicon-containing product may be removed from the aqueous medium by filtration, phase separation, or centrifugation. The resulting solid silicon containing product is washed with water one or more times to reduce its chloride content.

One particularly preferred cement clinker grinding aid composition according to the present invention is best characterized as being a high boiling residue from the direct process. This high boiling residue is neutralized with lime slurry (CaO+water) and produces a gel in the form of a water containing composition of 1 to about 45 percent by weight of a crosslinked polysiloxane. The gel according to this invention is referred to by reference to the acronym DPR Gel, i.e., direct process residue gel.

The composition used in the following examples contained 1 to about 55 percent by weight of solids, and the balance of the composition to 100 percent was water. As noted above, the solids consisted of about 1 to about 50 percent by weight of silicon fines, about 1 to about 40 percent by weight of metal salts, and the balance of the solids to 100 percent by weight were hydrolysis condensation products of mixed alkylhalosilanes and alkylchlorodisilanes.

When used as a grinding aid, the DPR gel can be added as-produced, or it may be slurried and pumped to the grinding process using a suitable slurrying medium such as water. The concentration of the grinding aid, will for economic effectiveness, depend on the material being milled, and the concentration level can be easily determined by one skilled in the art. For example, when used for grinding clinker, the DPR gel functions to reduce the grinding energy required to achieve a desired particle size, and so the most effective DPR gel levels of concentration can be in the range of about 200–10,000 ppm, particularly a range of about 800–1,200 ppm.

EXAMPLES

The following examples are set forth in order to illustrate the invention in more detail. In the Tables, $f_{c1}$ represents the Compressive Strength at one day, $f_{c3}$ is the Compressive Strength at 3 days, $f_{c7}$ is the Compressive Strength at 7 days, and $f_{c28}$ is the Compressive Strength at 28 days.

Example 1

The performance and productivity gain provided by the powdered additive referred to hereinafter as DPR GEL was evaluated as a grinding aid, in the production of different types of cements. One cement referred to herein as CP I 32 was a general purpose Portland cement, and a cement produced according to standards created by the Brazilian Technical Standards Association (ABNT) in 1991, for cements produced in Brazil. According to ABNT's standard, CP I 32 concrete must have a Compression Strength after 28 days of age of 32–49 MPa, and a composition containing 95–99 percent clinker and gypsum, and 1–5 percent of milled slags, limestone, or a pozzolanic based material such as fly ash, granulated blast furnace slag, stack dust, cinders, granulated or pelletized slag, and grinding sand. In this example, the CP I 32 cement was produced with 96 percent clinker, 4 percent gypsum, and a compound cement where slag had been added as filler. For evaluating the DPR GEL grinding aid performance, a work procedure was adopted according to the following methodology. The evaluation was based on the performance and power consumption demanded by a ball mill using six different dosages of DPR GEL grinding aid in the production of the CP I 32 cement.

Some of the physical and mechanical properties evaluated of cements produced with different DPR GEL grinding aid dosages were (i) the Blaine specific surface, (ii) the percentage of material retained in Tyler screens #200 and 325, (iii) the Compressive Strength at the ages of 1, 3, 7 and 28 days for the CP I 32 cement, and (iv) the Compressive Strength at the ages of 3, 7 and 28 days for the compound cements. The performance evaluations were based on DPR GEL grinding aid dosage levels of 200, 400, 500, 600, 800, and 1,000 grams of DPR GEL/tonne (1.102 US ton) of cement.

Milling was carried out using a grinding system including a standard laboratory ball mill equipped with an automatic monitoring and control system. The evaluations were performed on the one type CP I 32 cement, and on the compound cements, each prepared using crude raw materials obtained from the Minas Gerais region of Brazil where commercial cement producers of Brazil are located.

These cements were prepared by milling 5.0 kg of sample in a laboratory ball mill. Each of the cements had a chemical composition meeting standards prescribed by Brazilian Portland Cement Specifications created and administered by the Brazilian Technical Standards Association (ABNT) in 1991. This organization is responsible for classifying all types of cements produced in Brazil. All of the raw materials fed into the laboratory ball mill were previously separated from identical lots to avoid any variation on the individual evaluations.

The chemical composition of the cements was based on specifications as defined by the ABNT. Grinding aids in the amounts noted above, were added to the mixtures for the production of each cement as defined by ABNT, or as the crude raw material when used alone as the pure 100% clinker. Each mixture was ground for five hours in the ball mill, and a sample of the milled product was analyzed by sieving it through a 200 mesh screen to insure that it met the particle size measurement defined for cement type CP I 32 as defined in the standard NBR 11579 of the ABNT.

The percent retained in two different screens of 200 mesh and 325 mesh was measured to determine the grinding efficiency. The more ground material remaining in the screen, the lower was the efficiency of the grinding process. These results are shown in the Tables below for each specific evaluation. The Compressive Strength was measured using methods defined by the ABNT in its standard NBR 7215, for ages of 1, 3, 7, and 28 days, for CP I 32 cement, and these results are also shown in the Tables.

The laboratory ball mill specification and the crude raw materials used during these evaluations included the use of chrome alloy balls which were used in one chamber of the ball mill. About 29.8% of the balls had a size of 20 mm. The remainder of the balls were equally divided between balls with diameters of 40, 50, 60, and 70 mm, respectively. This set of balls provided a specific milling surface of about 20 $m^2$/tonne with a filling grade of about 42 percent. The rotational speed was equal to about 65% of the critical rotational speed of the system.

The specific area of milled Blaine clinker was measured using standards defined by NBR 7224, in which the area was determined by using the average value of three different samples, and discarding values with more than a five percent variation from the average. This is according to the standards as defined by the Brazilian Portland Cement Association (ABCP) and followed by commercial cement producers. The same type of measurement criteria was used in determining values for (i) the Compressive Strength for ages of 1, 3, 7 and 28 days, and (ii) the percent of the retained material in the 200 mesh screen and the 325 mesh screen, in which the average value of three different samples was used, and values with more than 5% variation of the average were not considered. Such evaluations of grinding efficiency based on various DPR GEL additive dosages are shown in Table 1.

TABLE 1

| Property | Units g/tonne, | Tests with Grinding Aid | | | | | | |
|---|---|---|---|---|---|---|---|---|
| DPR Gel Loading | ppm | 0 | 200 | 400 | 500 | 600 | 800 | 1,000 |
| Blaine Index | $m^2$/kg | 428 | 425 | 468 | 471 | 490 | 515 | 563 |
| Relative Grind Rate | Blaine ratio | 0% | 0% | 3% | 3% | 5% | 6% | 10% |
| Power | kWh/tonne | 18.8 | 18.4 | 18.4 | 18.2 | 18.1 | 17.9 | 17.8 |
| +200 mesh, >75 um | Percent | 2.8 | 2.1 | 2 | 2.1 | 1.5 | 1.8 | 1.3 |
| +325 mesh, 75 > size > 45 um | Percent | 12.1 | 13.2 | 10 | 9.7 | 9.2 | 8.5 | 6 |
| $f_{c1}$ average | MPa | 6.5 | 6 | 6.6 | 7.4 | 6.8 | 6.8 | 6.8 |
| $f_{c3}$ average | MPa | 25.5 | 24.8 | 26.1 | 28.9 | 27.5 | 28.2 | 30.5 |
| $f_{c7}$ average | MPa | 30.1 | — | — | 32 | — | — | — |
| $f_{c28}$ average | MPa | 36.8 | 36 | 36 | 37.5 | 36.4 | 38.2 | 38.5 |

The results shown in Table 1 represent the average of results achieved in separate evaluations. Table 1 shows that DPR GEL grinding aid is capable of providing an increase in the Blaine specific surface of a cement when compared with standard cements without the additive. The increase of specific surface area is considerable when the additive is used in higher dosages. For example, using dosages of 500, 600, 800, and 1000 grams of DPR GEL/tonne of cement, the Blaine specific surface values increased from 428 $m^2$/kg (standard without grinding aid) to 471, 490, 515, and 563 $m^2$/kg, respectively, with the additive. The fineness of cements generated from the use of DPR GEL grinding aid increased considerably with the increase of grinding aid dosages, reaching a high value of 563 m²/kg when using 1000 grams of DPR GEL/tonne of cement.

While evaluated values in power consumption of produced cements showed, what appears to be a small variance when using DPR GEL grinding aid, i.e., changing from 18.8 kWh/tonne for the cement without the grinding aid to 17.8 kWh/tonne when using a dosage of 1000 grams of DPR GEL/tonne of cement, the reduction of 5.32 percent is significant when considering in light of a whole cement plant. In this regard, 5.32 percent represents a significant amount of electrical power savings.

Example 2

In this example, the performance was evaluated of the direct addition of DPR GEL as an additive in the production of a CP I 32 type cement. It was determined that the DPR GEL did not harm the properties of the concrete produced, by adding 500 grams of DPR GEL/tonne of cement, as an additive ingredient to the milled cement. Results were obtained for evaluation of the Compressive Strength and the properties obtained during tests on the resulting cement. A standard of 96 percent clinker and 4 percent gypsum was milled in a laboratory ball mill without the use of a grinding aid for five hours. The resulting concrete from this evaluation is shown in Table 2 in the first column of data.

TABLE 2

| Property | Units | Direct Addition | |
|---|---|---|---|
| DPR Gel Loading | g/tonne (ppm) | 0 | 500 |
| Blaine Index | m²/kg | 421 | 429 |
| Relative Grind Rate | Blaine ratio | −1% | 0% |
| Power | kWh/tonne | 18.8 | |
| +200 mesh (>75 um) | Percent | 2 | 2.7 |
| +325 mesh (75 > size > 45 um) | Percent | 11.5 | 12 |
| $f_{c1}$ average | MPa | 6 | 6.8 |
| $f_{c3}$ average | MPa | 25.1 | 26 |
| $f_{c7}$ average | MPa | 29.8 | 31.1 |
| $f_{c28}$ average | MPa | 36.3 | 37.5 |

The last column in Table 2 represents results obtained when using a direct mixture of 5,000 grams of cement CP I 32 with 2.5 grams of DPR GEL as an additive, at an equivalent dosage of 500 grams of DPR GEL tonne of cement, and mixed for 5 minutes in a laboratory ball mill without grinding balls. Table 2 shows that addition of 500 grams of DPR GEL/tonne of cement contributed an increase in the Compressive Strength results in all the ages of 1, 3, 7 and 28 days.

It should be noted that while the invention has been described herein with respect to grinding cement clinker, the concepts and features disclosed can be used for grinding other materials such as mineral, ores, and fuels, i.e., coal.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A process for manufacturing hydraulic cement in which (i) raw materials are crushed and ground, (ii) the crushed and ground raw materials and other components are burned and calcined to prepare a cement clinker, and (iii) the cement clinker is ground to a fine powder; the improvement comprising adding to the cement clinker before it is ground in step (iii), a grinding aid comprising an uncalcined direct process residue gel which comprises an hydrolysis product of mixed alkylchlorosilanes and alkylhalodisilanes produced as by-products in the manufacture of alkylhalosilanes.

2. A process according to claim 1 in which the grinding aid is added in an amount of 200–10,000 ppm per tonne of cement.

3. A process according to claim 2 in which the grinding aid is added in an amount of 800–1,200 ppm per tonne of cement.

4. A process according to claim 1 in which the grinding aid is a composition comprising 1–55 percent by weight of solids and the balance of the composition to 100 percent is water.

5. A process according to claim 4 in which the solids in the grinding aid comprise about 1 to about 50 percent by weight of silicon fines, about 1 to about 40 percent by weight of metal salts, and the balance of the solids to 100 percent by weight is the hydrolysis condensation products of mixed alkylhalosilanes and alkylchlorodisilanes.

6. A process for grinding minerals, ores, or fuels, in which the minerals, ores, or fuels are crushed and ground with a grinding aid, the improvement comprising adding to the minerals, ores, or fuels as grinding aid, an uncalcined direct process residue gel which comprises an hydrolysis product of mixed alkylchlorosilanes and alkylhalodisilanes produced as by-products in the manufacture of alkylhalosilanes.

7. A process according to claim 6 in which the grinding aid is added in an amount of 200–10,000 ppm per tonne of the minerals, ores, or fuels.

8. A process according to claim 7 in which the grinding aid is added in an amount of 800–1,200 ppm per tonne of the minerals, ores, or fuels.

9. A process according to claim 6 in which the grinding aid is a composition comprising 1–55 percent by weight of solids and the balance of the composition to 100 percent is water.

10. A process according to claim 9 in which the solids in the grinding aid comprise about 1 to about 50 percent by weight of silicon fines, about 1 to about 40 percent by weight of metal salts, and the balance of the solids to 100 percent by weight is the hydrolysis condensation products of mixed alkylhalosilanes and alkylchlorodisilanes.

* * * * *